United States Patent [19]

Lehmann et al.

[11] Patent Number: 5,760,195
[45] Date of Patent: Jun. 2, 1998

[54] MONOAZO TRIAZINYL GROUP-CONTAINING FIBER REACTIVE DYES, PROCESSES FOR THEIR PREPARATION AND THEIR USE

[75] Inventors: Urs Lehmann, Basel; Marcel Frick, Reinach, both of Switzerland

[73] Assignee: Ciba Specialty Chemicals Corporation, Tarrytown, N.Y.

[21] Appl. No.: 752,291

[22] Filed: Nov. 19, 1996

[30] Foreign Application Priority Data

Nov. 23, 1995 [CH] Switzerland ............ 03317/95

[51] Int. Cl.$^6$ ............ C09B 62/008; C09B 62/085; C09B 62/473; C09B 62/51
[52] U.S. Cl. ............ 534/638; 534/632
[58] Field of Search ............ 534/638

[56] References Cited

U.S. PATENT DOCUMENTS

| | | | |
|---|---|---|---|
| 4,191,687 | 3/1980 | Austin | 260/153 |
| 4,378,313 | 3/1983 | Kayane et al. | 260/153 |
| 4,754,023 | 6/1988 | Tzikas et al. | 534/618 |
| 4,786,721 | 11/1988 | Tzikas et al. | 534/617 |
| 4,801,694 | 1/1989 | Scheibli et al. | 534/637 |
| 4,851,011 | 7/1989 | Lacroix et al. | 8/527 |
| 5,023,326 | 6/1991 | Tzikas et al. | 534/638 |
| 5,298,607 | 3/1994 | Seiler | 534/638 |
| 5,541,301 | 7/1996 | Jordine et al. | 534/635 |

FOREIGN PATENT DOCUMENTS

| | | |
|---|---|---|
| 0031099 | 7/1981 | European Pat. Off. |
| 0056975 | 8/1982 | European Pat. Off. |
| 0071985 | 2/1983 | European Pat. Off. |
| 0074928 | 3/1983 | European Pat. Off. |
| 0085025 | 8/1983 | European Pat. Off. |
| 0127456 | 12/1984 | European Pat. Off. |
| 0179019 | 4/1986 | European Pat. Off. |
| 0369385 | 5/1990 | European Pat. Off. |
| 0499588 | 8/1992 | European Pat. Off. |
| 0657508 | 6/1995 | European Pat. Off. |
| 50-157422 | 12/1975 | Japan |
| 53-46328 | 4/1978 | Japan |
| 53-46329 | 4/1978 | Japan |
| 56-118974 | 9/1981 | Japan |
| 57-49663 | 3/1982 | Japan |
| 57-199877 | 12/1982 | Japan |
| 59-174649 | 10/1984 | Japan |
| 60-47071 | 3/1985 | Japan |
| 62-164765 | 7/1987 | Japan |
| 1372527 | 10/1974 | United Kingdom |
| 1576237 | 10/1980 | United Kingdom |

OTHER PUBLICATIONS

Chem. Abst. 96:36799p, 1982 (JP-A-56/118,974).
Chem. Abst. 97:57111u, 1982 (JP-A-57/49,663).
Chem. Abst. 98:217159s, 1983 (JP-A-57/199,877).
Chem. Abst. 84:123403a, 1976 (JP-A-50/157,422).
Chem. Abst. 89:112372s 1978 (JP-A-53/46,328).
Chem. Abst. 89:112371r, 1978, (JP-A-53/46,329).
Chem. Abst. 102:63580j, 1985 (JP-A-59/174,649).
Chem. Abst. 102:222146r, 1985 (JP-A-60/47071).
Chem. Abst. 107:219139p, 1987 (JP-A-62/164,765).

*Primary Examiner*—Fiona T. Powers
*Attorney, Agent, or Firm*—David R. Crichton

[57] ABSTRACT

Reactive dyes of the formula

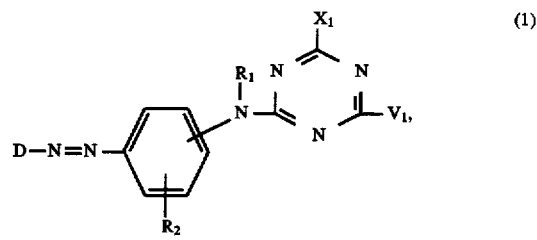

wherein

D is a radical of the formula

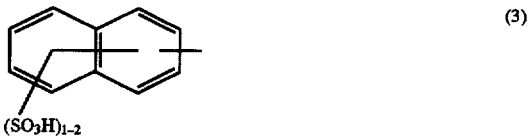

or

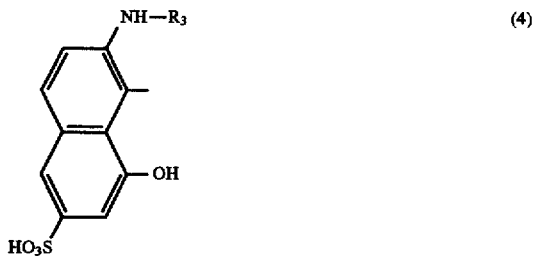

and $R_1$, $R_2$, $R_3$, $X_1$ and $V_1$ are as defined in claim 1, are particularly suitable for dyeing or printing natural or synthetic polyamide fibre materials.

16 Claims, No Drawings

MONOAZO TRIAZINYL GROUP-CONTAINING FIBER REACTIVE DYES, PROCESSES FOR THEIR PREPARATION AND THEIR USE

The present invention relates to novel reactive dyes, processes for their preparation and their use for dyeing or printing fibre materials.

The practice of dyeing with reactive dyes has recently led to increased requirements regarding the quality of the dyeings and the profitability of the dyeing process. Consequently, there continues to be a demand for novel reactive dyes which have improved properties, in particular in respect of application.

Reactive dyes which have a high degree of exhaustion and a high degree of fixing, and which, in particular, do not require alkaline after-treatment to remove non-fixed dye, are now required for dyeing. They should furthermore have a good dyeing yield and high reactivity. These requirements are not met in all properties by the known dyes.

The present invention is therefore based on the object of discovering novel, improved reactive dyes for dyeing and printing fibre materials, which have the qualities characterized above to a high degree. In particular, the novel dyes should be distinguished by high degrees of exhaustion, high fixing yields and high fibre-dye bond stabilities. They should furthermore produce dyeings with good allround properties, for example light and wet fastness properties.

It has been found that the object described is largely achieved with the reactive dyes defined below.

The invention therefore relates to reactive dyes of the formula

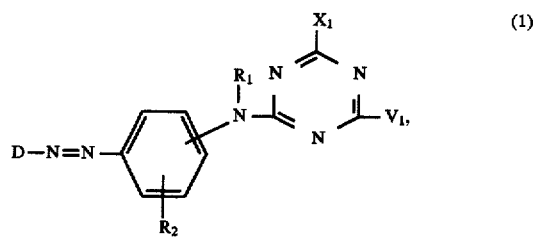

in which $R_1$ is hydrogen or substituted or unsubstituted $C_1$–$C_4$alkyl, $R_2$ is hydrogen, $C_1$–$C_4$alkyl, $C_1$–$C_4$alkoxy, $C_2$–$C_4$alkanoylamino, ureido, halogen or sulfo, $X_1$ is fluorine or chlorine, $V_1$ is a radical of the formula

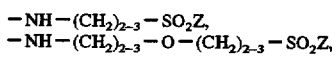

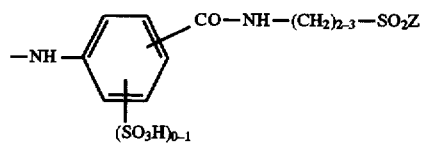

or

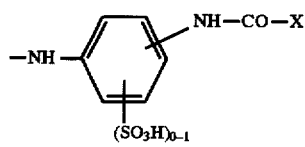

in which

Z is the radical —CH=CH$_2$ or —CH$_2$—CH$_2$—Y and Y is a leaving group,

X is the radical

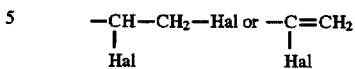

and Hal is halogen, and

D is a radical of the formula

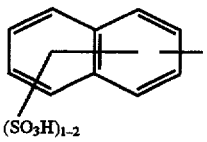

or

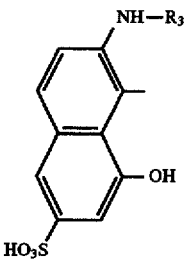

in which $R_3$ is hydrogen or $C_1$–$C_4$alkyl and where the reactive dyes of the formula (1) contain not more than two sulfo groups, with the proviso that if D is a radial of the formula (3), $V_1$ is a radical of the formula (2d).

$C_1$–$C_4$alkyl radicals $R_1$ are, for example, methyl, ethyl, propyl, isopropyl, butyl, sec-butyl, tert-butyl or isobutyl. The alkyl radicals mentioned can be unsubstituted or substituted, for example by hydroxyl, sulfo or sulfato.

Preferably, $R_1$ is hydrogen or $C_1$–$C_4$alkyl which is unsubstituted or substituted by hydroxyl, sulfo or sulfato, in particular hydrogen or $C_1$–$C_4$alkyl, and preferably hydrogen.

$C_1$–$C_4$alkyl $R_2$ and $R_3$ is, for example, methyl, ethyl, propyl, isopropyl, butyl, sec-butyl, tert-butyl or isobutyl, in particular methyl.

$C_1$–$C_4$alkoxy $R_2$ is, for example, methoxy, ethoxy, propoxy, isopropoxy, butoxy or isobutoxy, in particular methoxy.

Halogen $R_2$ is fluorine, chlorine or bromine, in particular chlorine.

$C_2$–$C_4$alkanoylamino $R_2$ is, in particular, acetylamino or propionylamino, preferably acetylamino.

Hal is prefer ably chlorine or, in particular, bromine.

The leaving group Y is, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$–C$_4$alkyl)$_2$. Preferably, Y is a group of the formula —Cl, —OSO$_3$H, —SSO$_3$H, —OCO—CH$_3$, —OCO—C$_6$H$_5$ or —OPO$_3$H$_2$, in particular —Cl, —OSO$_3$H or —OCO—CH$_3$, and particularly preferably —Cl or —OSO$_3$H. Y is especially preferably a group of the formula —OSO$_3$H.

$X_1$ is preferably chlorine.

The reactive dyes of the formula (1) preferably contain two sulfo groups.

Preferred reactive dyes of the formula (1) are those in which $R_1$ is hydrogen or $C_1$–$C_4$alkyl, in particular hydrogen, $R_3$ is hydrogen or methyl, in particular hydrogen $X_1$ is chlorine.

Y is —Cl or —$OSO_3H$ and

Hal is chlorine or bromine, in particular bromine.

The radicals —$(CH_2)_{2-3}$— contained in the formulae (2a) to (2c) are preferably those of the formula —$(CH_2)_2$—.

Preferred radicals $V_1$ are those of the formulae (2b), (2c) or (2d), in particular those of the formulae (2c) or (2d), and preferably those of the formula (2d).

Preferred radicals D of the formula (3) are those which contain two sulfo groups and which are preferably bonded to the azo group in position 2. Radicals D of the formula (3) which are further of interest are those which contain a sulfo group, in particular in position 6, and which are preferably bonded to the azo group in position 2. Radicals D of the formula (3) which are furthermore of interest are those which contain only one sulfo group and which are preferably bonded to the azo group in position 1.

The radical D of the formula (3) is particularly preferably a radical of the formula

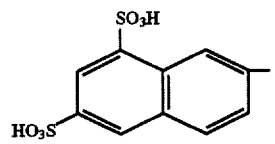

(5)

or

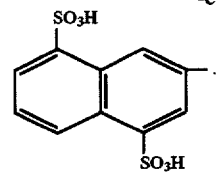

(6)

Radicals D of the formula (3) which are of interest are furthermore those of the formula

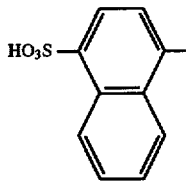

(5a)

or

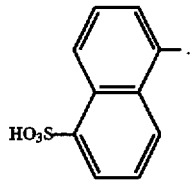

(6a)

Particularly preferred reactive dyes containing a radical D of the formula (3) are those of the formula

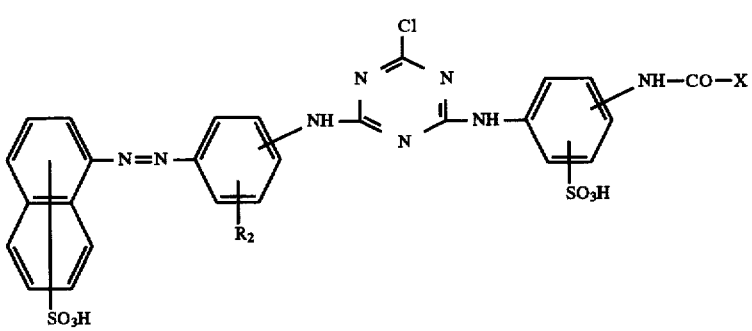

(7)

in which $R_2$ is hydrogen, $C_1$-$C_4$alkyl, $C_1$-$C_4$alkoxy, $C_2$-$C_4$alkanoylamino, ureido or halogen, in particular $C_1$-$C_4$alkyl, $C_1$-$C_4$alkoxy, $C_2$-$C_4$alkanoylamino, ureido or halogen, and preferably $C_1$-$C_4$alkyl, $C_1$-$C_4$alkoxy, $C_2$-$C_4$alkanoylamino or ureido, $X_1$ is fluorine or, in particular, chlorine and X is as defined and preferred above.

Reactive dyes containing a radical D of the formula (3) which are furthermore of interest are those of the formula (7a)

in which

R₂ is hydrogen, $C_1$-$C_4$alkyl, $C_1$-$C_4$alkoxy, $C_2$-$C_4$alkanoylamino, ureido or halogen, in particular $C_1$-$C_4$alkyl, $C_1$-$C_4$alkoxy, $C_2$-$C_4$alkanoylamino, ureido or halogen, and preferably $C_1$-$C_4$alkyl, $C_1$-$C_4$alkoxy, $C_2$-$C_4$alkanoylamino or ureido and X is as defined and preferred above. The radical R₂ is preferably bonded here ortho to the azo bridge. The sulfo group of the naphthalene ring is preferably bonded here in position 4 or 5.

Especially preferred reactive dyes containing a radical D of the formula (3) are those of the formulae

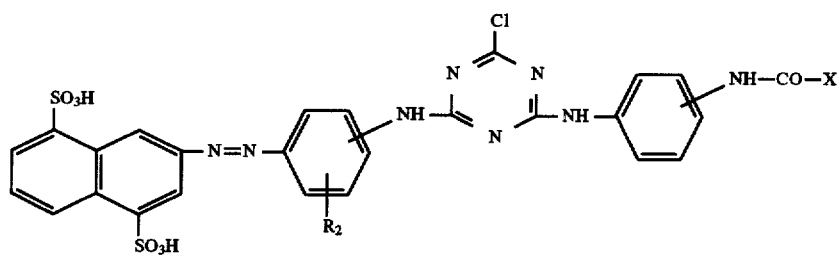 (8)

and

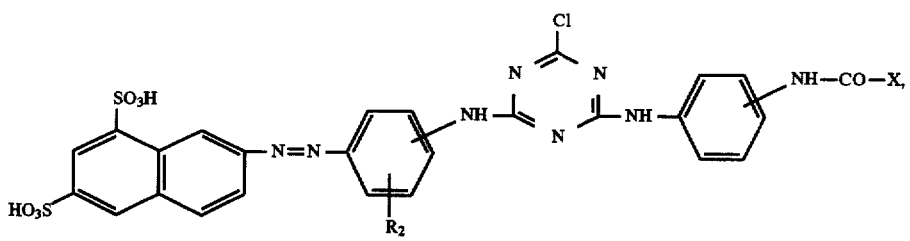 (9)

in which

R₂ is as defined and preferred under formula (7) and

X is as defined and preferred above.

Especially important reactive dyes containing a radical D of the formula (3) are those of the formulae

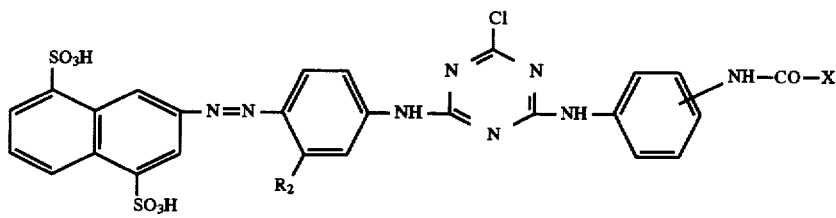 (10)

and

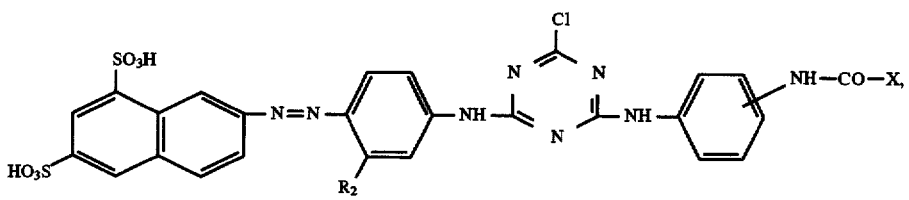 (11)

in which

R₂ is as defined and preferred under formula (7) and

X is as defined and preferred above.

Particularly preferred reactive dyes containing a radical D of the formula (4) are those of the formula

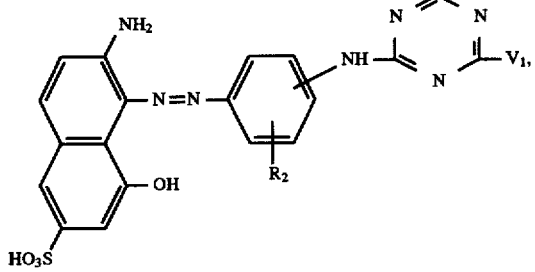

in which $R_2$ is hydrogen, $C_1$-$C_4$alkyl, $C_1$-$C_4$alkoxy, $C_2$-$C_4$alkanoylamino, ureido, halogen or sulfo, in particular hydrogen or sulfo, $X_1$ is fluorine or, in particular, chlorine and $V_1$ is as defined and preferred above.

Especially preferred reactive dyes containing a radical D of the formula (4) are those of the formula

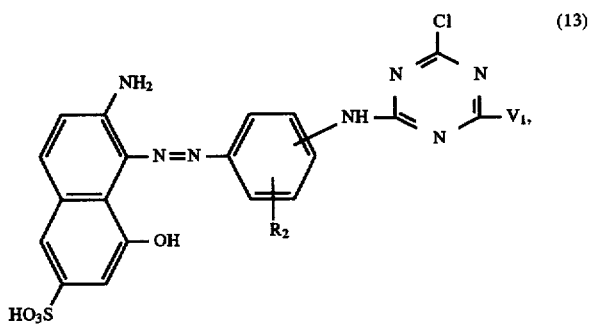

in which $R_2$ is as defined and preferred under formula (12) and $V_1$ is as defined and preferred above.

Especially important reactive dyes containing a radical D of the formula (4) are those of the formula

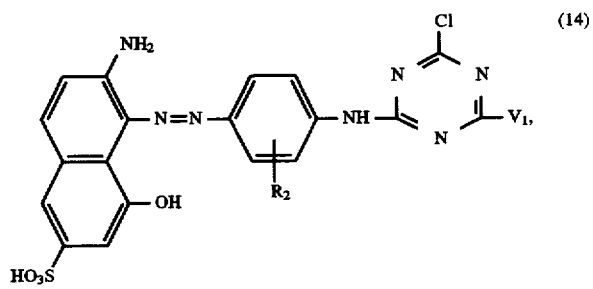

in which $R_2$ is as defined and preferred under formula (12) and $V_1$ is as defined and preferred above.

The present invention furthermore relates to a process for the preparation of the reactive dyes of the formula (1), which comprises reacting compounds of the formulae

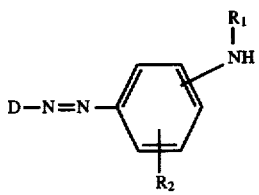

and

H—$V_1$ (16)

with cyanuric chloride or cyanuric fluoride and, if appropriate, subsequently carrying out a conversion reaction, where $R_1$, $R_2$, D and $V_1$ are as defined above under formula (1).

Since the individual abovementioned process steps can be carried out in various sequences, and if appropriate also simultaneously, various process variants are possible. In general, the reaction is carried out stepwise, the sequence of the simple reactions between the individual reaction comtponents advantageously depending on the particular conditions. Thus, for example, a compound of the formula (15) is reacted with cyanuric chloride or cyanuric fluoride and the resulting product is then subjected to a condensation reaction with a compound of the formula (16). Furthermore, for example, a compound of the formula (16) can be reacted with cyanuric chloride or cyanuric fluoride and the resulting product can then be subjected to a condensation reaction with a compound of the formula (15).

The individual condensation reactions are carried out, for example, by processes which are known per se, as a rule in aqueous solution, at a temperature of, for example, 0° to 50° C., in particular 0° to 10° C., and a pH of, for example, 3 to 10, in particular 3 to 7.

Furthermore, after the synthesis, conversion reactions, for example an elimination reaction, can be carried out. For example, reactive dyes of the formula (1) which contain sulfatoethylsulfonyl radicals or α,β-dihalogenopropionylamino radicals can be treated with a base, for example sodium hydroxide, the sulfatoethylsulfonyl radicals being converted into vinylsulfonyl radicals and the α,β-dihalogenopropionylamino radicals being converted into α-halogenoacryloylamino radicals.

The compounds of the formulae (15) and (16) are known or can be prepared analogously to known compounds.

The reactive dyes of the formula (1) according to the invention exist either in the form of their free salts or, preferably, as salts thereof. Salts are, for example, the alkali metal, alkaline earth metal or ammonium salts or the salts of an organic amine. Examples are the sodium, lithium, potassium or ammonium salts or the salt of mono-, di- or triethanolamine.

The reactive dyes according to the invention are suitable for dyeing and printing a wide range of materials, such as fibre materials containing hydroxyl groups or containing nitrogen. Examples are silk, leather, wool, polyamide fibres and polyurethanes, and all types of cellulosic fibre materials. Such cellulosic fibre materials are, for example, the natural cellulosic fibres, such as cotton, linen and hemp, as well as cellulose and regenerated cellulose.

Dyeing or printing of natural polyamide fibre materials, for example wool, and also of synthetic polyamide fibre materials, for example polyamide 6 or polyamide 6,6, is preferred. The reactive dyes according to the invention are furthermore suitable for dyeing or printing blend fabrics or yarns of wool and synthetic polyamide. Dyeing or printing of natural polyamide fibre materials, in particular wool, is particularly preferred.

The textile material mentioned can exist in a wide range of processing forms, for example as fibre, yarn, woven fabric or knitted fabric and, in particular, in the form of carpets.

The reactive dyes according to the invention can be applied to the fibre material and fixed on the fibre in various ways, in particular in the form of aqueous dye solutions and printing pastes, dyeing, in particular by the exhaust method, being preferred.

The reactive dyes according to the invention are distinguished by high reactivity, good fixing capacity and good exhaust properties. The reactive dyes according to the invention are also particularly suitable for printing, in particular for printing nitrogen-containing fibres. The reactive dyes according to the invention furthermore can readily be combined with other dyes.

The dyeings and prints produced with the reactive dyes according to the invention have a good fastness to light and very good wet fastness properties, such as fastnesses to washing, water, seawater, crossdyeing and perspiration. Dyeings which are level over the fibre and over the surface are obtained.

In the following examples, parts are parts by weight. The temperatures are degrees Celsius. Parts by weight bear the same relation to parts by volume as the gram to the cubic centimeter.

EXAMPLE 1 a) 8 parts of a compound which, in the form of the free acid, has the formula

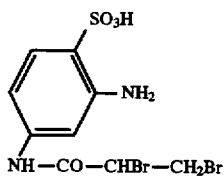

(101)

are stirred in 100 parts of water, the pH is brought to 6 by addition of 0.35 part of $Na_2HPO_4 \cdot 12H_2O$ and the mixture is cooled to a temperature of 0° C. A solution of 3.87 parts of cyanuric chloride and 50 parts of acetone is added dropwise to the resulting suspension in the course of 10 to 15 minutes, the pH being kept at a value of 3 by addition of aqueous sodium hydroxide solution. The mixture is subsequently stirred at a temperature of 0° to 2° C. and a pH of 3 for one hour. A suspension which comprises the compound, shown in the form of the free acid, of the formula

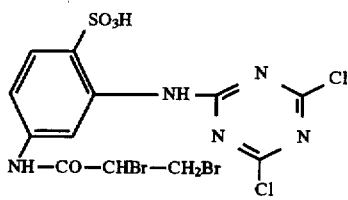

(102)

is obtained.

b) 6.5 parts of a compound which, in the form of the free acid, has the formula

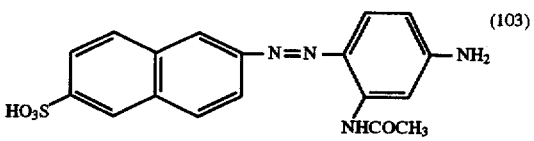

(103)

are dissolved in 158 parts of water and 9.1 parts of 2 normal sodium hydroxide solution at room temperature and a pH of 8 to 8.5. This solution is then added dropwise to the solution obtained as described above under a) in the course of 30 minutes, the pH being kept at a value of 6 by addition of aqueous sodium hydroxide solution. The mixture is stirred overnight at room temperature and a pH of 6 to 6.5. After addition of 5% by weight of sodium chloride, the mixture is stirred for a further two hours and the resulting dye is filtered off, washed with 250 parts of a 10% aqueous sodium chloride solution and dried at a temperature of 50° to 60° C. A dye is obtained which, in the form of the free acid, is the compound of the formula

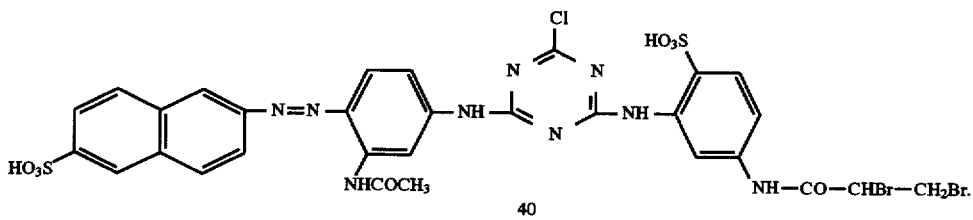

(104)

The dye of the formula (104) dyes wool and synthetic polyamide fibre material in yellow colour shades.

EXAMPLES 2 TO 8

The dyes shown in the form of the free acid in column 2 in the following Table 1, which dye wool and synthetic polyamide fibre material in the colour shades shown in column 3, can be obtained in an analogous manner to the instructions in Example 1. In the case of the dyes according to Examples 4 and 5, the first condensation reaction is carried out at a pH of about 6 and a temperature of about 10° C.

TABLE 1

| Example | Dye | Colour shade on wool and polyamide |
|---|---|---|
| 2 | HO₃S-naphthyl-N=N-[phenyl(NHCOCH₂CH₃)]-NH-[triazine(Cl)]-NH-[phenyl(SO₃H)]-NH-CO-CHBr-CH₂Br | yellow |
| 3 | [8-amino-1-hydroxy-3,6-disulfo-naphthyl(NH₂, OH, HO₃S)]-N=N-phenyl-NH-[triazine(Cl)]-NH-[phenyl(HO₃S)]-NH-CO-CHBr-CH₂Br | red |
| 4 | [8-amino-1-hydroxy-3-sulfo-naphthyl]-N=N-phenyl-NH-[triazine(Cl)]-NH-(CH₂)₂-O-(CH₂)₂-SO₂-CH₂CH₂Cl | red |
| 5 | [8-amino-1-hydroxy-3-sulfo-naphthyl]-N=N-[phenyl(HO₃S)]-NH-[triazine(Cl)]-NH-(CH₂)₂-O-(CH₂)₂-SO₂-CH₂CH₂Cl | red |
| 6 | [HO₃S-naphthyl]-N=N-[phenyl(CH₃)]-NH-[triazine(Cl)]-NH-[phenyl(HO₃S)]-NH-CO-CHBr-CH₂Br | yellow |
| 7 | [HO₃S-naphthyl]-N=N-[phenyl(NH-CO-NH₂)]-NH-[triazine(Cl)]-NH-[phenyl(HO₃S)]-NH-CO-CHBr-CH₂Br | yellow |

TABLE 1-continued

| Example | Dye | Colour shade on wool and polyamide |
|---|---|---|
| 8 | 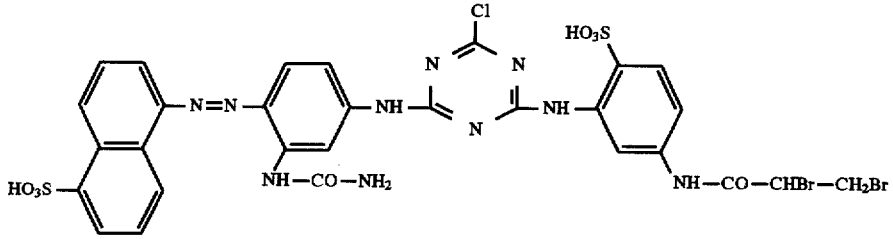 | yellow |

EXAMPLE 9 a) 4.75 parts of cyanuric chloride are suspended in a mixture of 47 parts of ice, 23 parts of water and 0.025 part of $Na_2HPO_4 \cdot 12H_2O$ at a temperature of 0° to 2° C. in the course of 15 minutes. A solution, heated to 30° to 35° C., of 300 parts of water and 11.6 parts of the compound of the formula

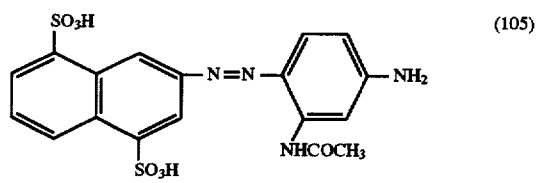
(105)

is then added dropwise to this suspension, the temperature being kept at 0° to 2° C. and the pH being kept at a value of 3 by addition of an aqueous sodium hydroxide solution. The mixture is then stirred under these conditions for a further hour. A solution is obtained which comprises the compound, shown in the form of the free acid, of the formula b) 8.9 parts of the compound of the formula

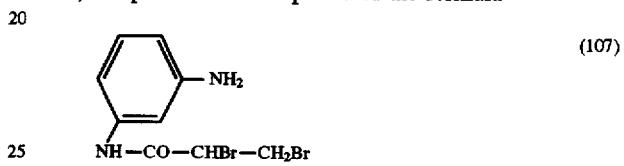
(107)

are dissolved in a mixture of 50 parts of water and 75 parts of acetone and the solution is added to the solution obtained as described above under a) in the course of 60 minutes, the pH being kept below a value of 4.6 and the temperature being allowed to rise no higher than 10° C. The reaction mixture is then stirred at a pH of 4.5 to 4.6 and a temperature of 10° C. for 3 hours, the pH being kept constant by addition of a 10% aqueous sodium bicarbonate solution. After addition of sodium chloride, the mixture is stirred overnight at room temperature and the dye is filtered off, washed with aqueous sodium chloride solution and dried at a temperature of 40° C. A dye is obtained which, in the form of the free acid, is the compound of the formula

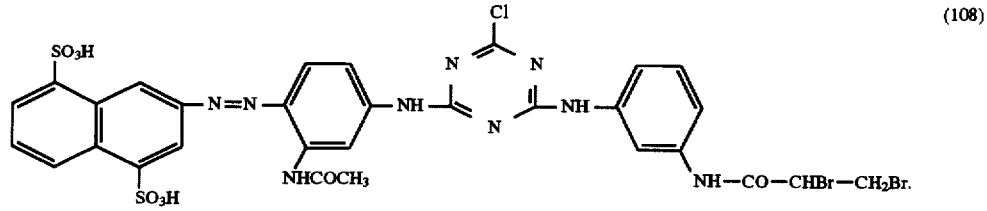
(108)

The dye of the formula (108) dyes wool and synthetic polyamide fibre material in yellow colour shades.

EXAMPLES 10 TO 18

The dyes shown in the form of the free acid in column 2 in the following Table 2, which dye wool and synthetic polyamide material in the colour shades shown in column 3, can be obtained in an analogous manner to the instructions in Example 9.

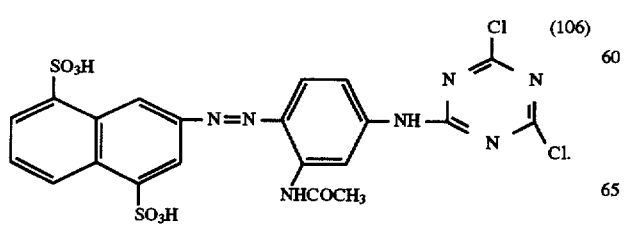
(106)

TABLE 2

| Example | Dye | Colour shade on wool and polyamide |
|---|---|---|
| 10 | 6-sulfo-naphthalene-1-sulfonic acid azo-linked to 2-methyl-4-[(4-chloro-1,3,5-triazin-2-yl)amino]phenyl, with the triazine's other amino substituent being 3-(2,3-dibromopropanoylamino)phenyl | yellow |
| 11 | 6,8-disulfonaphth-2-yl azo-linked to 2-methyl-4-[(4-chloro-1,3,5-triazin-2-yl)amino]phenyl, with the triazine's other amino substituent being 4-(2,3-dibromopropanoylamino)phenyl | yellow |
| 12 | 6,8-disulfonaphth-2-yl azo-linked to 2-methyl-4-[(4-chloro-1,3,5-triazin-2-yl)amino]phenyl, with the triazine's other amino substituent being 3-(2,3-dibromopropanoylamino)phenyl | yellow |
| 13 | 2-amino-8-hydroxy-6-sulfonaphth-1-yl azo-linked to 4-[(4-chloro-1,3,5-triazin-2-yl)amino]phenyl, with the triazine's other amino substituent being 3-[(2-(2-sulfatoethylsulfonyl)ethyl)carbamoyl]phenyl | red |
| 14 | 2-amino-8-hydroxy-6-sulfonaphth-1-yl azo-linked to 2-sulfo-4-[(4-chloro-1,3,5-triazin-2-yl)amino]phenyl, with the triazine's other amino substituent being 3-(2,3-dibromopropanoylamino)phenyl | red |
| 15 | 2-amino-8-hydroxy-6-sulfonaphth-1-yl azo-linked to 2-sulfo-4-[(4-chloro-1,3,5-triazin-2-yl)amino]phenyl, with the triazine's other amino substituent being 4-(2,3-dibromopropanoylamino)phenyl | red |

TABLE 2-continued

| Example | Dye | Colour shade on wool and polyamide |
|---|---|---|
| 16 | (structure) | red |
| 17 | (structure) | red |
| 18 | (structure) | yellow |

EXAMPLE 19 a) 36.8 parts of cyanuric chloride are suspended in 250 parts of ice, 150 parts of water and 0.2 part of Na$_2$HPO$_4$.12H$_2$O at a temperature of 8° C. and a pH of about 6. A solution of 45.3 parts of a compound of the formula $$H_2N-(CH_2)_2-O-(CH_2)_2-SO_2-CH_2CH_2Cl \qquad (109)$$

in 150 parts of water is then metered in over a period of 1.5 hours, the pH being kept at a value of 6.4 by addition of aqueous 10% sodium bicarbonate solution. The mixture is stirred at a temperature of 0° to 2° C. and a pH of 6.4 for one hour. It is subsequently stirred at a temperature of 8° to 10° C. and a pH of 6.4 for about 4 hours. After filtration and drying, a compound of the formula

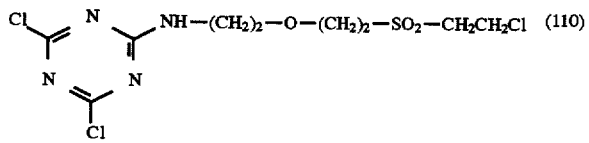

(110)

is obtained.

b) 22 parts of the compound of the formula (110) obtainable as described above under a) are suspended in 100 parts of ice-water at a temperature of 10° C. and a pH of 2.3. A solution of 10.2 parts of a compound of the formula

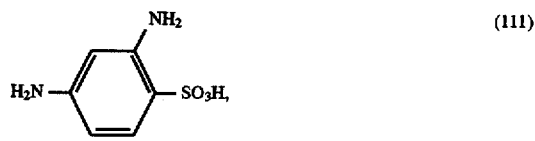

(111)

100 parts of water and 26 parts of a 2 normal aqueous sodium hydroxide solution is then added in the course of 15 minutes, a temperature of 35° to 40° C. becoming established and the pH being kept at a value of about 7 by addition of aqueous 10% sodium bicarbonate solution. The reaction mixture is stirred under these conditions for 6 hours. It is brought to a pH of 1 to 1.2 by means of hydrochloric acid (16%). After addition of sodium chloride, the product is filtered off and washed with aqueous sodium chloride solution. A moist press-cake is obtained which, shown in the form of the free acid, comprises the compound of the formula

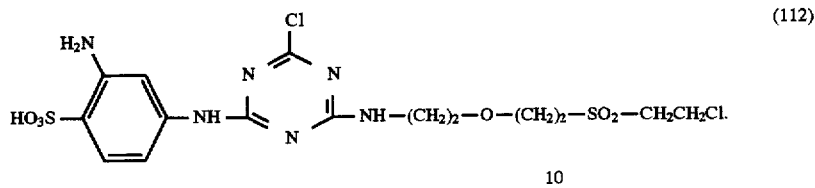
(112)

c) 17.5 parts of the press-cake obtainable as described above under b) are suspended in 175 parts of water at a temperature of 0° to 2° C. and the pH is brought to a value of 1 by means of hydrochloric acid (32%). Diazotization is carried out at a temperature of 5° to 10° C. in the course of 90 minutes by addition of 3.8 parts of an aqueous 4 normal sodium nitrite solution, and excess nitrite is then destroyed by addition of sulfamic acid.

d) To prepare a suspension of the coupling component, 3.7 parts of the compound of the formula

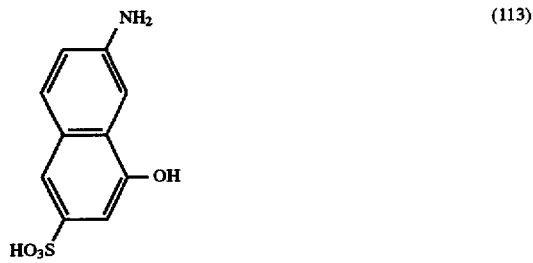
(113)

are dissolved in 50 parts of water and 3.6 parts of an aqueous 15% sodium hydroxide solution at room temperature and a pH of about 8.4. A pH of 3 to 3.5 is then established with acetic acid, and the mixture is cooled to a temperature of 0° to 5° C. The diazo component suspension obtainable as described above under c) is added to the resulting suspension in the course of 30 minutes. During this, the pH is kept at a value of 3.5 by means of an aqueous saturated sodium acetate solution. The mixture is then stirred at a pH of 3.5 and a temperature of 0° to 5° C. for one hour. After addition of sodium chloride, the mixture is subsequently stirred for a further 2 hours and the dye is filtered off, washed with aqueous sodium chloride solution and dried at a temperature of 30° C. A dye is obtained which, in the form of the free acid, is the compound of the formula The dye of the formula (114) dyes wool and synthetic polyamide fibre material in red colour shades.

EXAMPLE 20

3.06 parts of the dye obtainable according to Example 12 are stirred in 100 parts of water at a temperature of 60° to 70° C. The pH is kept at a value of 7 by addition of an aqueous 1 normal sodium hydroxide solution and acrylation is carried out under these conditions for a total of 135 minutes. The mixture is then cooled to room temperature and subsequently stirred for 30 minutes, after addition of potassium chloride, and the resulting dye is filtered off, washed with 100 parts of an aqueous potassium chloride solution and dried at a temperature of 30° C. A dye is obtained which, in the form of the free acid, is the compound of the formula

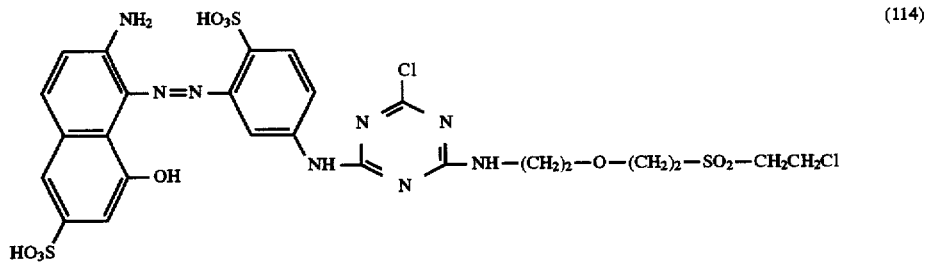
(114)

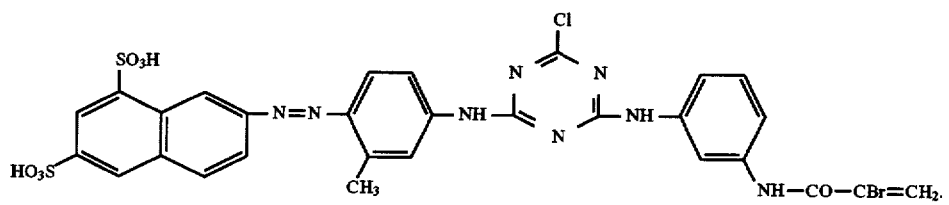
(115)

The dye of the formula (115) dyes wool and synthetic polyamide fibre material in yellow colour shades.

EXAMPLES 21 TO 36

The dyes shown in the form of the free acid in column 2 in the following Table 3, which dye wool and synthetic polyamide fibre material in yellow colour shades, can be obtained in an analogous manner to the instructions in Example 20. In the case of the dyes containing a radical of the formula $-NH-(CH_2)_2-O-(CH_2)_2-SO_2-CH=CH_2$, the vinylation is carried out at a pH of about 8 to 10 and a temperature of about 25° C.

TABLE 3

| Example | Dye | Colour shade |
|---|---|---|
| 21 | (structure) | yellow |
| 22 | (structure) | yellow |
| 23 | (structure) | yellow |
| 24 | (structure) | red |

TABLE 3-continued
| Example | Dye | Colour shade |
|---|---|---|
| 25 | 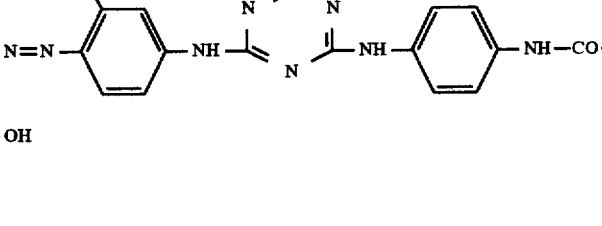 | red |
| 26 | 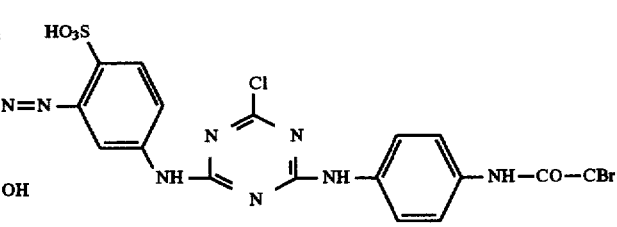 | red |
| 27 | 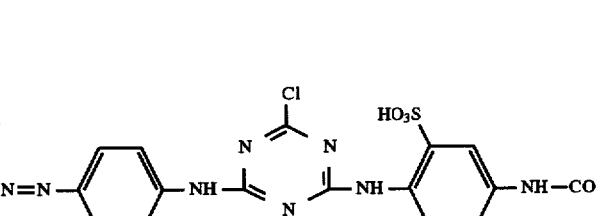 | red |
| 28 | 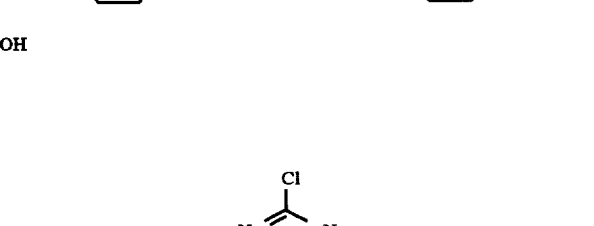 | red |
| 29 | 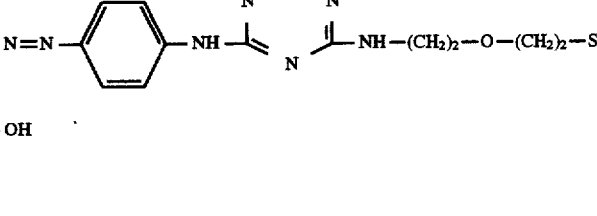 | red |

TABLE 3-continued

| Example | Dye | Colour shade |
|---|---|---|
| 30 | (structure) | red |
| 31 | (structure) | red |
| 32 | (structure) | red |
| 33 | (structure) | yellow |
| 34 | (structure) | yellow |
| 35 | (structure) | yellow |

TABLE 3-continued

| Example | Dye | Colour shade |
|---|---|---|
| 36 | 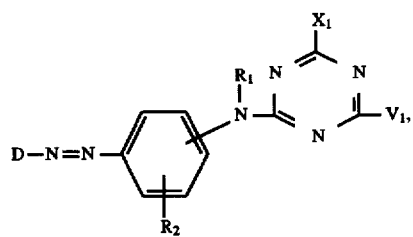 | yellow |

Dyeing instructions 0.1 part of the dye according to Example 1 is dissolved in 200 parts of water, and 0.5 part of sodium sulfate, 0.1 part of a levelling assistant (based on the condensation product of a higher aliphatic amine and ethylene oxide) and 0.5 part of sodium acetate are added. The pH is then brought to a value of 5.5 with acetic acid (80%). The dyebath is heated at 50° C. for 10 minutes and 10 parts of a woollen fabric are then added. The bath is heated to a temperature of 100° C. in the course of about 50 minutes and dyeing is carried out at this temperature for 60 minutes. Thereafter, the bath is allowed to cool to 90° C. and the dyed goods are removed. The woollen fabric is washed with hot and cold water and then spun and dried. A yellow dyeing is obtained which has good light and wet fastness properties and good levelness.

What is claimed is:

1. A reactive dye of the formula

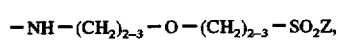
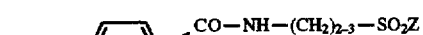
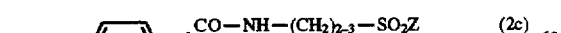

(1)

in which $R_1$ is hydrogen or substituted or unsubstituted $C_1$–$C_4$alkyl, $R_2$ is hydrogen, $C_1$–$C_4$alkyl, $C_1$–$C_4$alkoxy, $C_2$–$C_4$alkanoylamino, ureido, halogen or sulfo, $X_1$ is fluorine or chlorine, $V_1$ is a radical of the formula —NH—(CH$_2$)$_{2-3}$—O—(CH$_2$)$_{2-3}$—SO$_2$Z, (2b)

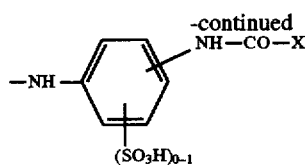 (2c)

or

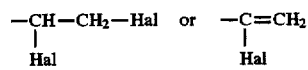 (2d)

in which

Z is the radical —CH=CH$_2$ or —CH$_2$—CH$_2$—Y and Y is a leaving group,

X is the radical $$-\underset{\underset{Hal}{|}}{CH}-CH_2-Hal \quad \text{or} \quad -\underset{\underset{Hal}{|}}{C}=CH_2$$

and Hal is halogen, and

D is a radical of the formula

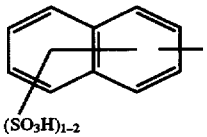 (3)

or

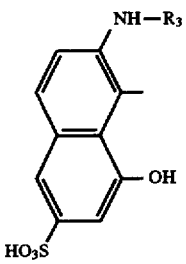 (4)

in which $R_3$ is hydrogen or $C_1$–$C_4$alkyl and where the reactive dyes of the formula (1) contain not more than two sulfo groups, with the proviso that if D is a radical of the formula (3), $V_1$ is a radical of the formula (2d).

2. A reactive dye according to claim 1, in which $R_1$ is hydrogen or $C_1$–$C_4$alkyl which is unsubstituted or substituted by hydroxyl, sulfo or sulfato.

3. A reactive dye according to claim 1, in which $R_1$ is hydrogen or $C_1$–$C_4$alkyl.

4. A reactive dye according to claim 1, in which $R_3$ is hydrogen.

5. A reactive dye according to claim 1, in which $X_1$ is chlorine.

6. A reactive dye according to claim 1, in which

Y is —Cl or —OSO$_3$H.

7. A reactive dye according to claim 1, in which Hal is chlorine or bromine.

8. A reactive dye according to claim 1, in which the radical D of the formula (3) contains two sulfo groups.

9. A reactive dye according to claim 1, of the formula

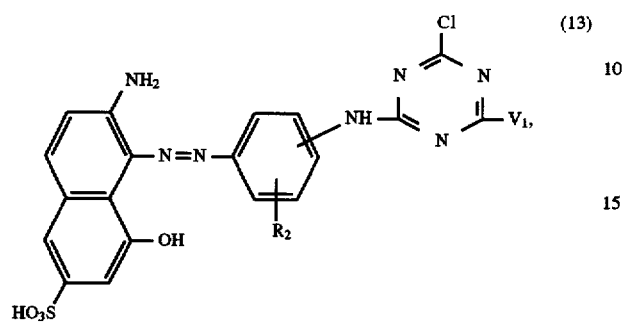
(13)

in which

R$_2$ is hydrogen, C$_1$–C$_4$alkyl, C$_1$–C$_4$alkoxy, C$_2$–C$_4$alkanoylamino, ureido, halogen or sulfo, and V$_1$ is as defined in claim 1.

10. A reactive dye according to claim 1, of the formula

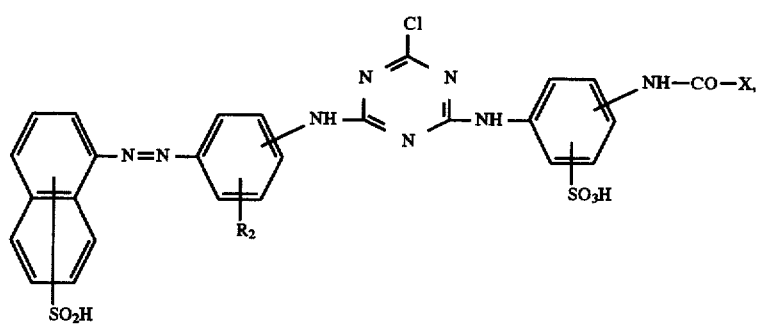
(7a)

in which

R$_2$ is hydrogen, C$_1$–C$_4$alkyl, C$_1$–C$_4$alkoxy, C$_2$–C$_4$alkanoylamino, ureido or halogen, and X is as defined in claim 1.

11. A reactive dye according to claim 1, of the formula

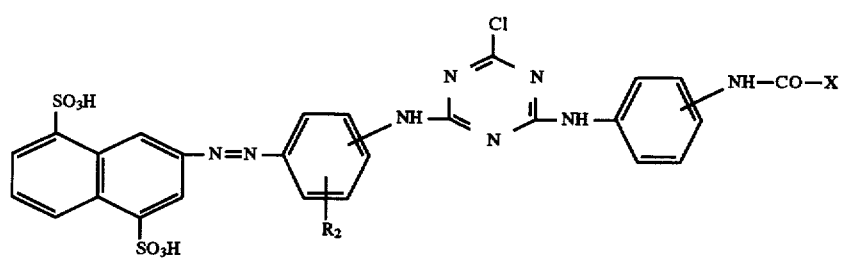
(8)

or

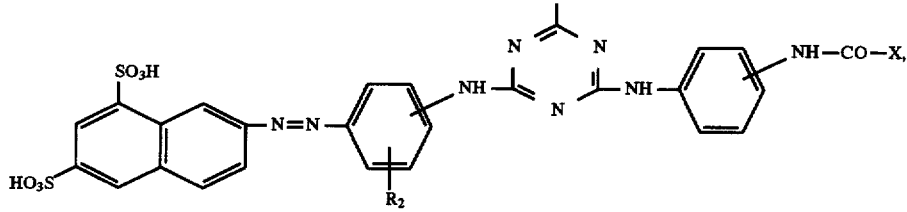
(9)

in which

R$_2$ is hydrogen, C$_1$–C$_4$alkyl, C$_1$–C$_4$alkoxy, C$_2$–C$_4$alkanoylamino, ureido or halogen, and X is as defined in claim 1.

12. A reactive dye according to claim 1, in which V$_1$ is a radical of the formula (2c) or (2d).

13. A reactive dye according to claim 1, in which V$_1$ is a radical of the formula (2d).

14. A process for the preparation of a reactive dye according to claim 1, which comprises reacting compounds of the formulae

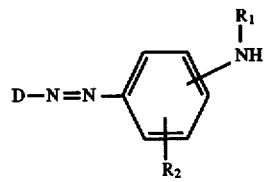 (15)

and

H—V$_1$  (16)

with cyanuric chloride or cyanuric fluoride and, optionally, subsequently carrying out a conversion reaction, where R$_1$, R$_2$, D and V$_1$ are as defined in claim 1.

15. A process for dyeing or printing fibre material containing hydroxyl groups or containing nitrogen, which process comprises the step of applying to said fibre material a tinctorially effective amount of a reactive dye according to claim 1.

16. A process according to claim 15 wherein said fibre material is natural or synthetic polyamide fibre material.

* * * * *